United States Patent
Scheib et al.

[11] Patent Number: 5,988,884
[45] Date of Patent: Nov. 23, 1999

[54] GUIDE RAIL ARRANGEMENT

[75] Inventors: Frank Scheib, Nounkirchen; Klaus Baalmann, Wiesbach; Jorg Gwosdek, Spiesen-Elversberg; Ralf Moseberg, Kindsbach; Thomas Winkler, Sulzbach; Barbara Fess, Limbach; Thomas Kurz, Homburg; Rainer Kleber, Sulzbach; Joecbim Ritter, Herzogenaurach; Rolf Fleischhauer, Furth, all of Germany

[73] Assignee: INA Wälzlager Schaeffler KG, Germany

[21] Appl. No.: 08/984,549

[22] Filed: Dec. 3, 1997

[30] Foreign Application Priority Data

Dec. 6, 1996 [DE] Germany .............. 196 50 698

[51] Int. Cl.$^6$ .............. F16C 19/00; A47C 29/02
[52] U.S. Cl. .................................. 384/50; 384/34
[58] Field of Search .................. 384/18, 19, 34, 384/40, 50, 51, 54; 248/430; 297/341

[56] References Cited

U.S. PATENT DOCUMENTS

| Re. 34,981 | 6/1995 | Mottate ........................ 384/50 X |
| 4,375,905 | 3/1983 | Drouillard . |
| 4,725,032 | 2/1988 | Kazaoka et al. ............. 384/50 X |
| 5,224,781 | 7/1993 | Rohee ............................ 384/34 |

FOREIGN PATENT DOCUMENTS

| 10 775 44 | 9/1960 | Germany . |
| 19 390 12 | 5/1966 | Germany . |
| 12 987 84 | 2/1973 | Germany . |
| 23 425 77 | 3/1975 | Germany . |
| 74 210 67 | 7/1975 | Germany . |
| 81 182 54 | 7/1985 | Germany . |
| 91 126 00 | 1/1992 | Germany . |
| 41 335 09 | 4/1993 | Germany . |
| 42 413 69 | 11/1993 | Germany . |
| 38 327 78 | 9/1995 | Germany . |

Primary Examiner—Tamara L. Graysay
Assistant Examiner—Brandon C. Stallman
Attorney, Agent, or Firm—Bierman, Muserlian and Lucas

[57] ABSTRACT

A guide rail arrangement for connecting two relatively displaceable components comprising a lower rail (1) and an upper rail (2) supported thereon by rolling elements (3), said lower and upper rails being configured as rectilinear sheet metal profiles, one of the lower and upper rails partially surrounding the other of the lower and upper rails, whereby hollow spaces are formed for receiving the rolling elements (3) and further slide elements (4) arranged between the rails is characterized in that, in a central region of the arrangement, the two rails (1, 2) define a receiving space (5) for a spring and/or damping element, which receiving space (5) is adjoined by regions comprising the rolling elements and the slide elements (4) and extending in end regions of the rails (1, 2) which results in the creation of an arrangement with uniform load distribution on its components so that a deformation of the components and a pressing-in of the rolling elements is reliably prevented.

9 Claims, 2 Drawing Sheets

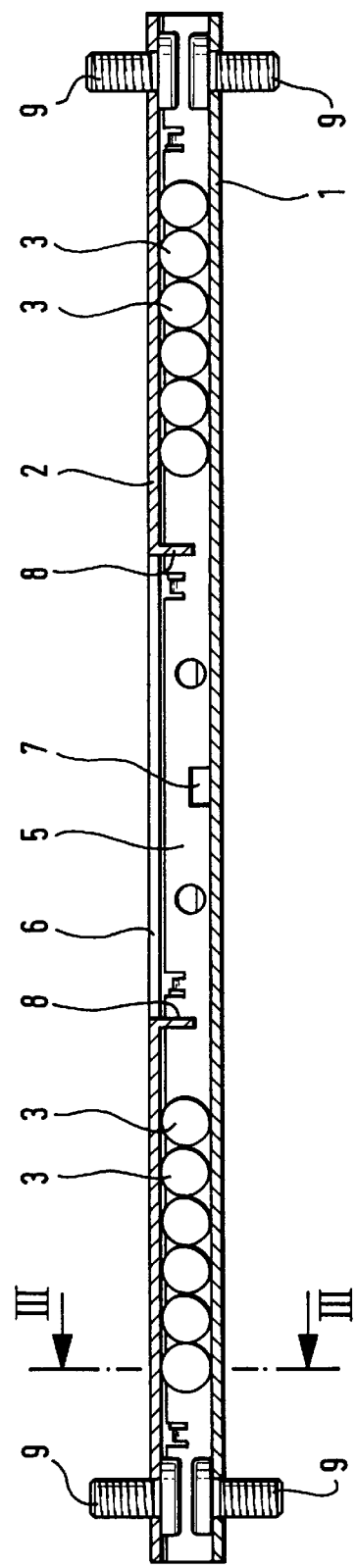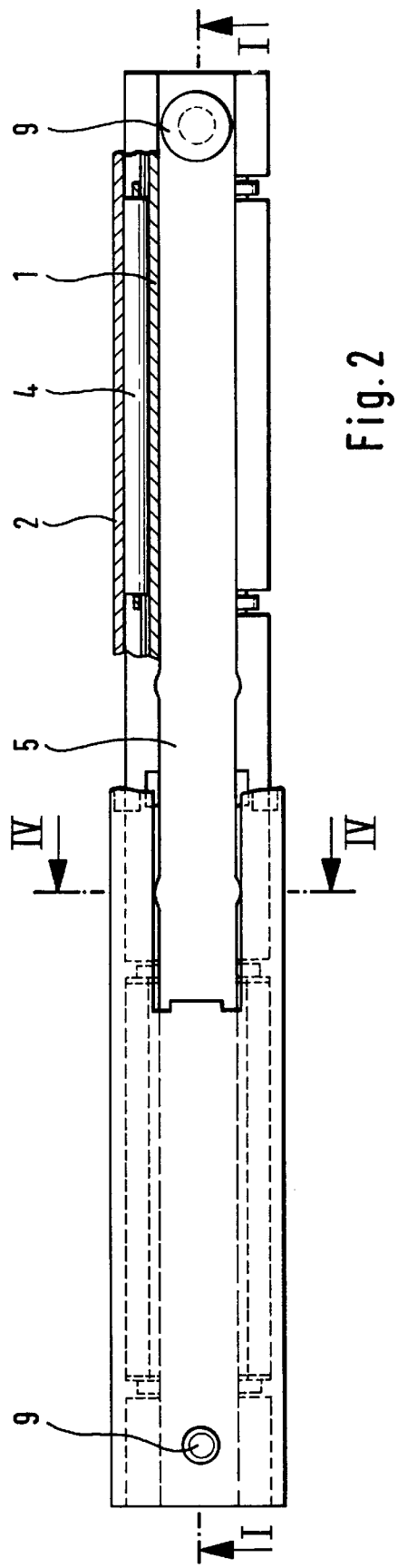

GUIDE RAIL ARRANGEMENT

FIELD OF THE INVENTION

The invention concerns a guide rail arrangement for connecting two relatively displaceable components comprising a lower rail and an upper rail supported thereon by rolling elements, said lower and upper rails being configured as rectilinear sheet metal profiles, one of said lower and upper rails partially surrounding the other of said lower and upper rails, whereby hollow spaces are formed for receiving the rolling elements and further slide elements arranged between the rails.

BACKGROUND OF THE INVENTION

Such a guide rail arrangement can be used as a displacing device for a mass which has to be displaced in a frame. In an arrangement of this type shown in German Application No. 38 32 778 C2, the transmission of force from the upper rail to the lower rail is effected by one roller and two steel balls arranged between the rails. To prevent parts of the arrangement from being deformed as a result of occurring forces i.e., to give a seat displacing device an adequate stiffness, each end portion of the lower rail of another embodiment described in this document, comprises a reinforcing element having the same cross-section as the lower rail and bearing against this rail. This, however, makes construction more complicated and expensive.

German Application No. 42 41 369 C1 shows a guide rail arrangement in which the upper rail is supported on the lower rail only by balls. A deflecting roller for an elastic elastomer billet which exerts a restoring force under prestress is mounted in the lower rail.

In a guide rail arrangement of the initially cited type described in German Application No. 41 33 509 A1 and the corresponding German Application No. 91 12 600 U1, the slide elements have a cylindrical configuration and are made of a self-lubricating plastic. Apart from lubrication, in a prestressed, deformed state they also serve to prevent a rattling of the rails which bear against each other.

OBJECTS OF THE INVENTION

It is an object of the invention to create a guide rail arrangement which assures a uniform distribution of load on its components so that a deformation thereof and a pressing-in of the rolling elements is reliably prevented and, by this, guarantees a jerkless relative displacement between the rails.

This and other objects and advantages of the invention will become obvious from the following detailed description.

SUMMARY OF THE INVENTION

The invention achieves these objects by the fact that, in a central longitudinal region of the arrangement, the two rails define a receiving space which is open through a lateral aperture in one of the rails for receiving a spring and/or damping element which, as a result of supplied and stored energy, effects a resetting into the original position, the receiving space being adjoined by regions comprising the rolling elements and the slide elements and extending in end regions of the rails. In this way, a linear guide with an integrated spring and/or damping element is created which constitutes a structural unit with the smallest possible design space requirement. Compressive, tensile an d lateral forces can be transmitted via the rolling elements and the slide elements.

When the arrangement is used with a machine or a plant, the impacts acting on the machine in the longitudinal direction of the rails are no longer transmitted directly to the mass. The novel guide rail arrangement permits an absolutely uniform and jerkless displacement with appropriate displacing resistance. As a result of the optimum load distribution, any kind of pressing-in of the rolling elements into the raceways is prevented so that jerkless displacement is guaranteed over the entire operating life.

The rolling elements of one of the regions can be rollers or balls. The use of a cylindrical element permits the transmission of a high load. As compared to balls, rollers have the advantage of higher loadability.

The slide elements of one of the regions can be constituted by two parallel rods or by two parallel rows of balls. It is also possible to use two parallel layers of a sliding material for this purpose, e.g. a polymeric material. Such a slide element material can be applied to the upper or the lower rail, for example by spraying. As an alternative, rolling elements (balls) can likewise be used in this region.

Limiting stops for the rolling elements on the rails can be provided in the form of screws with which the rails are detachably fixed on adjacent components. It is further possible to make the limiting stops for the rolling elements on the upper rail in the form of bent-over met al tabs. A fixing element (bent-over tab or pin) for the spring and/or damping element can be arranged on the lower rail so as to project into th e receiving space. Due to the arrangement of the rolling elements on the ends of the assembly and due to the central arrangement of the spring a nd/or damping element, the linear guide of the invention is able to absorb high moments.

The combination of rolling elements and profiled sheet metal results in cost-effective manufacture and a further saving is possible by using unhardened sheet metal. A further cost advantage can be obtained by using sheet metal of the same cross-section for the upper and the lower rail.

The guide rail arrangement of the invention is therefore a linear guide with an integrated design space for a spring and/or damping element which can absorb force in two directions, the energy supplied to and stored in said element effecting a resetting into the original position. A wide use of such a linear guide in mechanical engineering for damping impacts is conceivable. It is also possible to arrange a plurality of spring and/or damping elements in such a linear guide.

BRIEF DESCRIPTION OF THE DRAWINGS

One example of embodiment of the invention is represented in the drawings and will be described more closely below.

FIG. 1 is a longitudinal cross-section through a guide rail arrangement of the invention, taken along line I—I of FIG. 2, FIG. 2 is a top view of the guide rail arrangement showing a partial section taken along line II—II of FIG. 4.

DETAILED DESCRIPTION OF THE DRAWINGS

Figure 3:
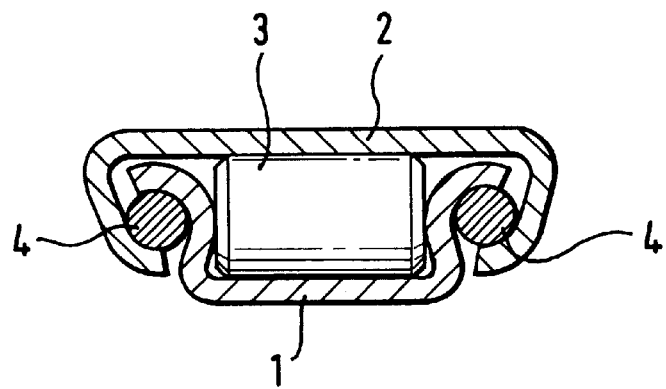
FIG. 3 is a cross-section through the guide rail arrangement taken along line III—III of FIG. 1.
Figure 4:
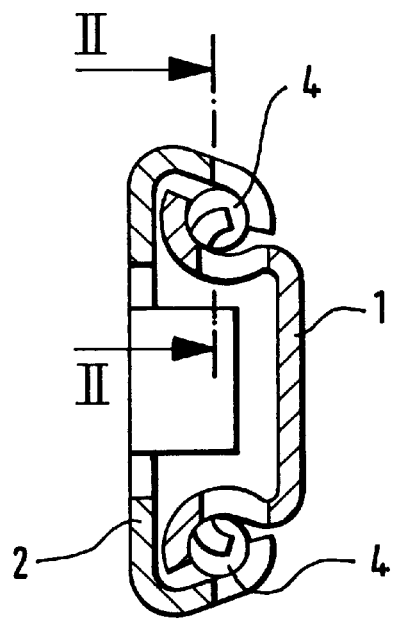
FIG. 4 is a cross-section through the guide rail arrangement taken along line IV—IV of FIG. 2.

A guide rail arrangement according to the invention comprises a lower rail 1 and an upper rail 2, both of which are configured as long, rectilinear sheet metal profiles. The lower rail 1 is partly surrounded by the upper rail 2 so that hollow spaces are formed in which rolling elements in the form of rollers 3 and further slide elements 4 are arranged on which the upper rail 2 is supported on the lower rail 1. The rollers 3 are grouped into two groups, each of which is situated in one end region of the guide rail arrangement. The slide elements 4 are arranged pairwise and parallel to each other on the two sides of the rollers 3 in each end region.

In a central region, the guide rail arrangement comprises a receiving space 5 for the insertion of a spring and/or damping element. This receiving space 5 is open towards the outside through an aperture 6 in the central region of the upper rail 2. A fixing element 7 starting from the lower rail and configured as a bent-over sheet metal tab or as a pin fixed on the lower rail 1 extends within the receiving space 5.

The displacement of the upper rail 2 relative to the lower rail 1 is limited by stops against which the outer roller 3 of the respective group of rollers comes to bear. These stops are formed as sheet metal tabs 8 bent towards the receiving space 5 from the upper rail 2. However, the stops for limiting displacement can also be constituted by screws 9 which are inserted through bores on the ends of the rails 1 and 2 and screwed into adjacent components. In this way, the lower rail 1 can be fixed on a vehicle and the upper rail 2 on a vehicle seat which is to be arranged for displacement within the vehicle.

Figure 5:
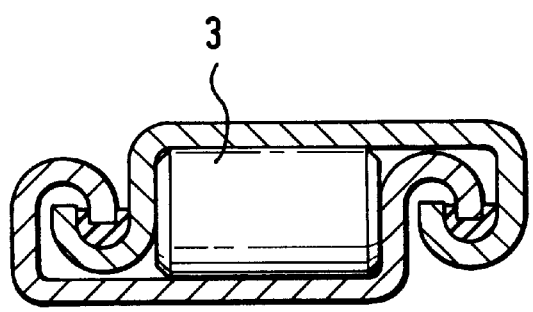
FIG. 5 is a cross-section through a modified guide rail arrangement in which a lower rail and an upper rail have the same configuration.

In the example of embodiment shown in FIG. 5, the lower and the upper rail have an identical configuration. Although the structure is not symmetrical in this case, the use of only one sheet profile offers a cost advantage.

Various modifications of the guide rail arrangement of the invention may be made without departing from the spirit or scope thereof and it is to be understood that the invention is intended to be limited only as defined in the appended claims.

What we claim is:

1. A guide rail arrangement for connecting two relatively displaceable components comprising a lower rail (1) and an upper rail (2) supported thereon by rolling elements, said lower and upper rails (1, 2) being configured as rectilinear sheet metal profiles, one of said lower and upper rails (1, 2) partially surrounding the other of said lower and upper rails (1, 2) whereby hollow spaces are formed for receiving the rolling elements and further slide elements (4) arranged between the rails (1, 2), characterized in that, in a central longitudinal region of the arrangement, the two rails (1, 2) define a receiving space (5) which is open through a lateral aperture (6) in one of the rails (1, 2) for receiving a spring or damping element which, as a result of supplied and stored energy, effects a resetting into an original position, the receiving space (5) being adjoined by regions comprising the rolling elements and the slide elements (4) and extending in end regions of the rails (1, 2), wherein a fixing element (7) for the spring or damping element is arranged on the lower rail (1) and projects into the receiving space (5).

2. An arrangement of claim 1 wherein the rolling elements arranged in one of the regions are rollers (3).

3. An arrangement of claim 1 wherein the rolling elements arranged in one of the regions are balls.

4. An arrangement of claim 1 wherein the slide elements (4) arranged in each region are two parallel rods.

5. An arrangement of claim 1 wherein the slide elements (4) arranged in each region are two parallel rows of balls.

6. An arrangement of claim 1 wherein the slide elements (4) arranged in each region are two parallel layers of a sliding material such as a polymeric material.

7. An arrangement of claim 1 wherein limiting stops for the rolling elements on the rails (1, 2) are constituted by screws (9) with which the rails (1, 2) are detachably fixed on adjacent components.

8. An arrangement of claim 1 wherein limiting stops for the rolling elements on the upper rail (2) are constituted by bent-over sheet metal tabs (8).

9. An arrangement of claim 1 wherein the upper rail and the lower rail have identically configured cross-sections.

* * * * *